United States Patent
Chen

(10) Patent No.: US 9,389,458 B2
(45) Date of Patent: Jul. 12, 2016

(54) BACKLIGHT MODULE AND DISPLAY DEVICE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 92 days.

(21) Appl. No.: 14/338,355

(22) Filed: Jul. 23, 2014

(65) Prior Publication Data

US 2015/0029700 A1 Jan. 29, 2015

(30) Foreign Application Priority Data

Jul. 24, 2013 (TW) ............................ 102126389 A

(51) Int. Cl.
*G02F 1/1335* (2006.01)
(52) U.S. Cl.
CPC .... *G02F 1/133605* (2013.01); *G02F 1/133615* (2013.01); *G02F 1/133553* (2013.01); *G02F 2203/62* (2013.01)
(58) Field of Classification Search
CPC .......... G02F 1/133605; G02F 2203/62; G02B 6/0023; G02B 6/0031; G02B 6/0055; G02B 6/0056
USPC ................................ 362/600–634, 97.1–97.4
See application file for complete search history.

(56) References Cited

U.S. PATENT DOCUMENTS

| 5,815,303 A * | 9/1998 | Berlin | G02B 26/0833 348/E5.077 |
| 6,559,827 B1 * | 5/2003 | Mangerson | G09F 13/18 345/102 |
| 2009/0115937 A1 * | 5/2009 | Guo | G02B 6/0055 349/65 |
| 2009/0161368 A1 * | 6/2009 | Pakhchyan | G02B 6/0033 362/298 |
| 2010/0045896 A1 * | 2/2010 | Shikii | G02B 27/106 349/62 |
| 2010/0208163 A1 * | 8/2010 | Fuchikami | G02B 26/0816 349/62 |
| 2011/0228195 A1 * | 9/2011 | Shikii | G02B 6/0031 349/62 |
| 2012/0182484 A1 * | 7/2012 | Imai | G03B 21/2033 348/744 |
| 2013/0121019 A1 * | 5/2013 | Yankov | G02B 6/0001 362/603 |
| 2013/0321742 A1 * | 12/2013 | Yankov | G02F 1/1336 349/62 |

* cited by examiner

*Primary Examiner* — Evan Dzierzynski
*Assistant Examiner* — Zheng Song
(74) *Attorney, Agent, or Firm* — ScienBiziP, P.C.

(57) ABSTRACT

A backlight module and a display device having the backlight module are disclosed. The backlight module includes tricolor light sources, a light combining unit, a linear reflection unit, and a two-dimension reflection unit. The light combining unit is configured to combine tricolor beams to a white light beam. The linear reflection unit includes a plurality of first micro electro mechanical systems (MEMS) reflectors arranged in a line, and is configured to periodically reflect white light beams. The two-dimension reflection unit includes a plurality of second MEMS reflectors arranged in rows and columns, and the second MEMS reflectors in each row faces and interacts with a first MEMS reflector. The second MEMS reflectors are configured to periodically reflect light beams emitted from the linear reflection unit, to form a surface light source.

13 Claims, 2 Drawing Sheets

BACKLIGHT MODULE AND DISPLAY DEVICE

FIELD

The present disclosure relates to a backlight module and a display device having the backlight module.

BACKGROUND

A side-type backlight module includes a light guide plate, a number of light sources, and an optical lens unit. The light sources are cold cathode fluorescence lamps or white light-emitting diodes. The light guide plate is configured to scatter the light beams emitted from the light sources to obtain a surface light source. The optical lens unit is configured to guide the light beams emitted from the light guide plate to be emitted at a predetermined angle.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
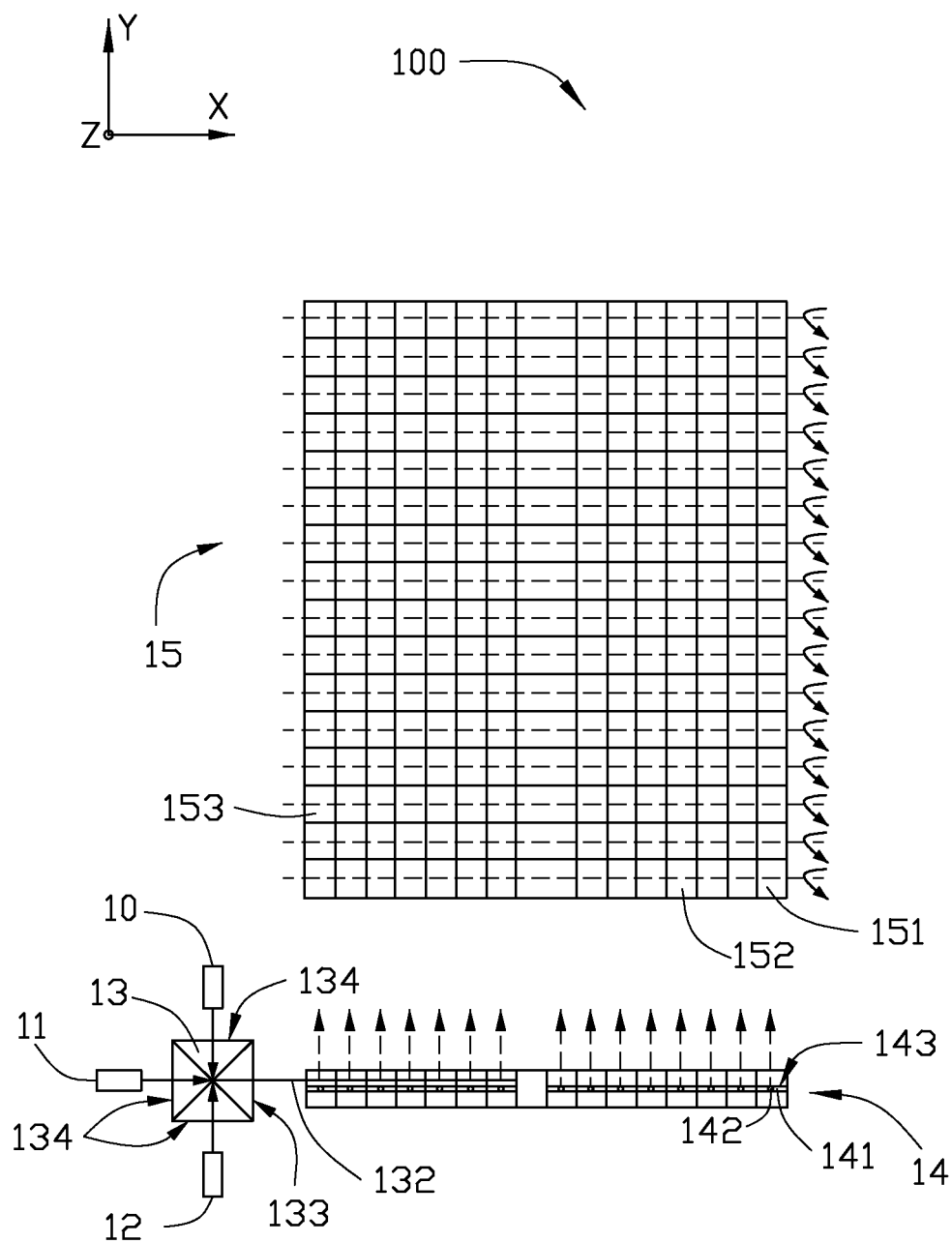
FIG. 1 is a diagrammatic view of a backlight module, according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A backlight module comprises a plurality of tricolor light sources, a light combining unit, a linear reflection unit, and a two-dimension reflection unit. The light combining unit is configured to combine the three-color light emitted from the plurality of light sources into a white light beam. The linear reflection unit comprises a plurality of first micro electro mechanical systems (MEMS) reflectors arranged in a line, and configured to periodically reflect light beams emitted from the light combining unit. The light beams emitted from the first MEMS reflectors are perpendicular to a line wherein the first MEMS reflectors are arranged. The two-dimension reflection unit comprises a plurality of second MEMS reflectors arranged in rows and columns. Each column couples to a corresponding one of the plurality of first micro electro mechanical systems reflectors and faces a light emitting side of a corresponding first micro electro mechanical systems reflector. The plurality of the second MEMS reflectors in each row is equal to the number of the first MEMS reflector. The second MEMS reflectors are configured to periodically reflect light beams emitted from the linear reflection unit one by one. The light beams emitted from the second MEMS reflectors are perpendicular to the two-dimension reflection unit, to form a surface light source.

Each of the first MEMS reflectors comprises a first rotatable shaft and a first reflection surface. The first rotatable shaft is perpendicular to the emitting direction of the white light beam emitted from the light combining unit.

Each of the second MEMS reflectors comprises a second rotatable shaft and a second reflection surface. The second rotatable shaft is parallel with the emitting direction of the white light beam emitted from the light combining unit.

The number of the first MEMS reflectors and the number of the second MEMS reflectors in each row are M. The number of the second MEMS reflectors in each column is N. The period of time for rotating all of the first MEMS reflectors from an original location to a predetermined location and then back to the original location is $\frac{1}{60}$ of a second. The period of time for rotating an individual first MEMS reflector from an original location to a predetermined location then back to the original location is $\frac{1}{60}$M of a second. M and N are natural numbers greater than 2.

The light combining unit comprises three light incident surfaces and a light emitting surface. The three light incident surfaces and the light emitting surface are parallel with each other. The tricolor light sources are separately arranged adjacent to the three light incident surfaces of the light combining unit.

The light combining unit comprises four right-angle prisms coupled together.

A display device comprises a backlight module and a display panel. The display panel is arranged on the light emitting side of the two-dimension reflection unit of the backlight module. The backlight module comprises a plurality of tricolor light sources, a light combining unit, a linear reflection unit, and a two-dimension reflection unit. The light combining unit is configured to combine the three-color light emitted from the plurality of light sources into a white light beam. The linear reflection unit comprises a plurality of first MEMS reflectors arranged in a line, and configured to periodically reflect light beams emitted from the light combining unit. The light beams emitted from the first MEMS reflectors are perpendicular to a line wherein the first MEMS reflectors are arranged. The two-dimension reflection unit comprises a plurality of second MEMS reflectors arranged in rows and columns. Each column couples to a corresponding one of the plurality of first micro electro mechanical systems reflectors and faces a light emitting side of a corresponding first micro electro mechanical systems reflector. The plurality of the second MEMS reflectors in each row is equal to the number of the first MEMS reflector. The second MEMS reflectors are configured to periodically reflect light beams emitted from the linear reflection unit one by one. The light beams emitted from the second MEMS reflectors are perpendicular to the two-dimension reflection unit, to form a surface light source. A display panel is arranged on the light emitting side of the two-dimension reflection unit of the backlight module.

Each of the first MEMS reflectors comprises a first rotatable shaft and a first reflection surface. The first rotatable shaft is perpendicular to the emitting direction of the white light beam emitted from the light combining unit.

Each of the second MEMS reflectors comprises a second rotatable shaft and a second reflection surface. The second rotatable shaft is parallel with the emitting direction of the white light beam emitted from the light combining unit.

The number of the first MEMS reflectors and the number of the second MEMS reflectors in each row are M. The number of the second MEMS reflectors in each column is N. The period of time for rotating all of the first MEMS reflectors from an original location to a predetermined location and then back to the original location is $\frac{1}{60}$ of a second. The period of time for rotating an individual first MEMS reflector from an original location to a predetermined location then back to the original location is $\frac{1}{60}$M of a second. M and N are natural numbers greater than 2.

The light combining unit comprises three light incident surfaces and a light emitting surface. The three light incident surfaces and the light emitting surface are parallel with each other. The tricolor light sources are separately arranged adjacent to the three light incident surfaces of the light combining unit.

The light combining unit comprises four right-angle prisms coupled together.

The display panel comprises a plurality of pixel regions, each pixel region comprises three sub-pixel regions. Each of the second MEMS reflectors is coupled to a sub-pixel region. The light beams reflected from each of the second MEMS reflectors enter into a sub-pixel region.

The light beams emitted from the tricolor light sources are laser linear polarized light beams. The display panel is a liquid crystal display panel. The display panel comprises a via light polarizer on a side adjacent to the two-dimension reflection unit. An optical vibration direction of light beams emitted from the two-dimension reflection unit is identical to the vibration-propagation direction of the via light polarizer.

FIG. 1 illustrates a backlight module 100 in accordance with a first embodiment. The backlight module 100 includes a red laser light source 10 for emitting red laser beams, a green laser light source 11 for emitting green laser beams, a blue laser light source 12 for emitting blue laser beams, a light combining unit 13, a linear reflection unit 14, and a two-dimension reflection unit 15.

In this embodiment, the light combining unit 13 is a light combining prism. The light combining unit 13 includes four right-angle prisms coupled together. In this embodiment, the four right-angle prisms are adhered together. The light combining unit 13 includes three light incident surfaces 134 and a light emitting surface 133. The three light incident surfaces 134 and the light emitting surface 133 are parallel with each other. The four right-angle prisms are all covered by predetermined optical films. The red laser light source 10, the green laser light source 11, and the blue laser light source 12 are separately arranged adjacent to the three light incident surfaces 134 of the light combining unit 13. The light combining unit 13 is configured to combine the tricolor laser beams emitted from the tricolor laser light sources into a white light beam 132. In the illustrated embodiment, an XYZ-coordinate system is defined. The emitting direction of the white light beam 132 corresponds to the direction of the X-axis.

The linear reflection unit 14 includes a plurality of first MEMS reflectors 141 arranged in a line. Each of the first MEMS reflectors 141 includes a first rotatable shaft 142 and a first reflection surface 143. The first rotatable shaft 142 is perpendicular to the emitting direction of the white light beam 132. In this embodiment, the first rotatable shaft 142 is parallel with the Y-axis. Each of the first MEMS reflectors 141 is connected to a piezo-electric driver (not shown), and can be driven to a reciprocating motion in a predetermined range and at a predetermined frequency. The number of the first MEMS reflectors 141 is defined to be M, wherein M is a natural number greater than 2. The first MEMS reflectors 141 are configured to reflect light beams emitted from the light combining unit 13. The light beams emitted from the first MEMS reflectors 141 are perpendicular to the line wherein the first MEMS reflectors 141 are arranged.

The two-dimension reflection unit 15 includes a plurality of second MEMS reflectors 151 arranged in rows and columns corresponding to the directions of the X-axis and the Y-axis. The number of the second MEMS reflectors 151 in each row is equal to the number of the first MEMS reflector 141, which is also M. The number of the second MEMS reflector 151 in each column is defined to be N, wherein N is a natural number greater than 2. The second MEMS reflectors 151 in each column couple to a first MEMS reflector 141. Each of the second MEMS reflectors 151 includes a second rotatable shaft 152 and a second reflection surface 153. The second rotatable shaft 152 is parallel with the emitting direction of the white light beam 132, which is also the direction of the X-axis. Each of the second MEMS reflectors 151 is connected to a piezo-electric driver (not shown), and can be driven to a reciprocating motion in a predetermined range and at a predetermined frequency. The second MEMS reflectors 151 in each column face a light emitting side of a corresponding first MEMS reflector 141. The second MEMS reflectors 151 are configured to reflect light beams emitted from the linear reflection unit 14. The light beams emitted from the second MEMS reflectors 151 are perpendicular to the two-dimension reflection unit 15, which is also parallel with the Z-axis, to form a surface light source.

In use, the tricolor laser beams emitted from the tricolor laser light sources are combined to a white light beam 132 by the light combining unit 13. Then, the white light beam 132 is emitted to the linear reflection unit 14 from the light emitting surface 133 of the light combining unit 13.

The first MEMS reflectors 141 are rotated one by one and at a predetermined frequency, to periodically reflect the white light beam 132 to the second MEMS reflectors 151 of the two-dimension reflection unit 15. By taking the time for all the first MEMS reflectors 141 to rotate from an original location to a predetermined location then back to the original location one by one, a period C1 is defined. The period C1 is equal to, or less than, $\frac{1}{60}$ of a second, then the time for rotating each of the first MEMS reflectors 141 from the original location to the predetermined location then back to the original location is equal to or less than $\frac{1}{60} \div M = \frac{1}{60}M$ of a second, and in this period C1, the reflection frequency of the light beams reflected by each of the first MEMS reflectors 141 is equal to or more than 60 Hz. The emission of light beams from the linear reflection unit 14 at such a frequency can appear to be a continuous linear light source to human eyes. In this embodiment, the period of time for rotating each of the first MEMS reflectors 141 from the original location to the predetermined location then back to the original location is $\frac{1}{60}$M of a second.

The second MEMS reflectors 151 are rotated one by one and at a predetermined frequency, to periodically reflect the white light beam 132 emitted from the first MEMS reflectors 141. In this embodiment, the period of time for rotating each of the second MEMS reflectors 151 from the original location to the predetermined location then back to the original location is $\frac{1}{60}$MN of a second, thus the light beams emitted from the two-dimension reflection unit 15 at such a frequency can appear to be a continuous surface light source.

Figure 2:
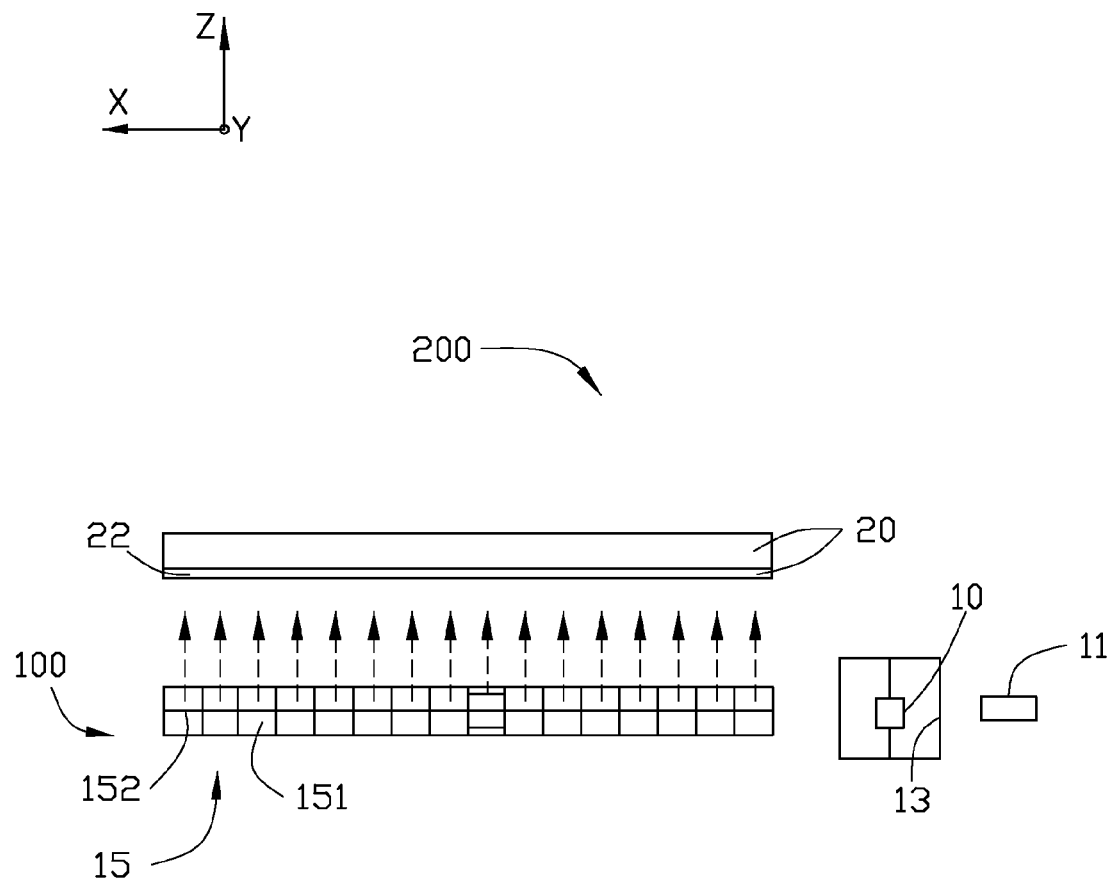
FIG. 2 is diagrammatic view of a display device, according to a second embodiment.

FIG. 2 illustrates a display device 200 in accordance with a second embodiment. The display device 200 includes the backlight module 100 in the first embodiment, and a display panel 20. In this embodiment, the display panel 20 is a liquid crystal display panel 20. The display panel 20 is arranged on the light emitting side of the backlight module 100, which is also the light emitting side of the two-dimension reflection unit 15. The display panel 20 includes a plurality of pixel regions. Each pixel region comprises three sub-pixel regions, and each sub-pixel region emits a red, or a blue, or a green light. Each of the second MEMS reflectors 151 is coupled to a sub-pixel region. The light beams reflected from each of the second MEMS reflectors 151 enter into a sub pixel region. For example, if the display panel 20 includes 600×400 pixel regions, and the number of the sub-pixel regions is 1800× 1200, the number M of the second MEMS reflectors 151 in one row is therefore 1800, the number N of the second MEMS reflectors 151 in one column is 1200, or if the number M of the second MEMS reflectors 151 in one row is 1200, the number N of the second MEMS reflectors 151 in one column is therefore 1800. The display panel 20 includes a via light polarizer 22 on a side adjacent to the two-dimension reflection unit 15. The light beams emitted from the two-dimension reflection unit 15 are linear polarized light beams in this embodiment, and an optical vibration direction of light beams emitted from the two-dimension reflection unit 15 is identical to a vibration-propagation direction of the via light polarizer 22.

In another embodiment, the display panel 20 can be other type of display panel, for example, an organic light-emitting diode (OLED) display panel.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A backlight module, comprising:
   a plurality of tricolor light sources;
   a light combining unit configured to combine the tricolor light beams emitted from the plurality of tricolor light sources into a white light beam;
   a linear reflection unit comprising a plurality of first micro electro mechanical systems (MEMS) reflectors arranged in a line, and configured to periodically reflect light beams emitted from the light combining unit, wherein the light beams emitted from the first micro electro mechanical systems reflectors perpendicular to a line wherein the first micro electro mechanical systems reflectors being arranged; and
   a two-dimension reflection unit comprising a plurality of second micro electro mechanical systems reflectors arranged in rows and columns, each column coupling to a corresponding one of the plurality of first micro electro mechanical systems reflectors and facing a light emitting side of a corresponding first micro electro mechanical systems reflector, wherein the plurality of the second micro electro mechanical systems reflectors in each row being equal to the number of the first micro electro mechanical systems reflector, the second micro electro mechanical systems reflectors configured to periodically reflect light beams emitted from the linear reflection unit, the light beams emitted from the second MEMS reflectors perpendicular to the two-dimension reflection unit, to form a surface light source;
   wherein each of the second micro electro mechanical systems reflectors comprises a second rotatable shaft and a second reflection surface, the second rotatable shaft is parallel with the emitting direction of the white light beam emitted from the light combining unit.

2. The backlight module of claim 1, wherein each of the first micro electro mechanical systems reflectors comprises a first rotatable shaft and a first reflection surface, the first rotatable shaft is perpendicular to the emitting direction of the white light beam emitted from the light combining unit.

3. The backlight module of claim 1, wherein the number of the first micro electro mechanical systems reflectors, and the number of the second micro electro mechanical systems reflectors in each row are M, the number of the second micro electro mechanical systems reflectors in each column is N, the period of time for rotating all of the first micro electro mechanical systems reflectors from an original location to a predetermined location then back to the original location is ⅙₀ of a second, and the period of time for rotating an individual first micro electro mechanical systems reflector from an original location to a predetermined location then back to the original location is ⅙₀M of a second, wherein M and N are all natural number and are all greater than 2.

4. The backlight module of claim 1, wherein the light combining unit comprises three light incident surfaces and a light emitting surface, the three light incident surfaces and the light emitting surface are parallel with each other, the tricolor light sources are separately arranged adjacent to the three light incident surfaces of the light combining unit.

5. The backlight module of claim 4, wherein the light combining unit comprises four right-angle prisms coupled together.

6. A display device, comprising:
   a backlight module, comprising:
      a plurality of tricolor light sources;
      a light combining unit configured to combine the tricolor light beams emitted from the plurality of tricolor light sources into a white light beam;
      a linear reflection unit comprising a plurality of first micro electro mechanical systems reflectors arranged in a line, and configured to periodically reflect light beams emitted from the light combining unit, wherein the light beams emitted from the first micro electro mechanical systems reflectors perpendicular to a line where the first micro electro mechanical systems reflectors being arranged; and
      a two-dimension reflection unit comprising a plurality of second micro electro mechanical systems reflectors arranged in rows and columns, each column coupling to a corresponding one of the plurality of first micro electro mechanical systems reflectors and facing a light emitting side of a corresponding first micro electro mechanical systems reflector, wherein the plurality of the second micro electro mechanical systems reflectors in each row being equal to the number of the first micro electro mechanical systems reflector, the second micro electro mechanical systems reflectors configured to periodically reflect light beams emitted from the linear reflection unit, the light beams emitted from the second MEMS reflectors perpendicular to the two-dimension reflection unit, to form a surface light source; and
   a display panel arranged on the light emitting side of the two-dimension reflection unit of the backlight module;

wherein each of the second micro electro mechanical systems reflectors comprises a second rotatable shaft and a second reflection surface, the second rotatable shaft is parallel with the emitting direction of the white light beam emitted from the light combining unit.

7. The display device of claim 6, wherein each of the first micro electro mechanical systems reflectors comprises a first rotatable shaft and a first reflection surface, the first rotatable shaft is perpendicular to the emitting direction of the white light beam emitted from the light combining unit.

8. The display device of claim 6, wherein the number of the first micro electro mechanical systems reflectors, and the number of the second micro electro mechanical systems reflectors in each row are M, the number of the second micro electro mechanical systems reflector in each column is N, the periods of time for rotating all of the first micro electro mechanical systems reflectors from a original location to a predetermined location then back to the original location is $\frac{1}{60}$ of a second, and times for rotating an individual first micro electro mechanical systems reflectors from an original location to a predetermined location then back to the original location is $\frac{1}{60M}$ of a second, wherein M and N are all natural number and are all greater than 2.

9. The display device of claim 6, wherein the light combining unit comprises three light incident surfaces and a light emitting surface, the three light incident surfaces and the light emitting surface are parallel with each other, the tricolor light sources are separately arranged adjacent to the three light incident surfaces of the light combining unit.

10. The display device of claim 9, wherein the light combining unit comprises four right-angle prisms coupled together.

11. The display device of claim 6, wherein the display panel comprises a plurality of pixel regions, each pixel region comprises three sub-pixel regions, each of the second micro electro mechanical systems reflectors is coupled to a sub-pixel region, the light beams reflected from each of the second micro electro mechanical systems reflectors enter into a sub-pixel regions.

12. The display device of claim 6, wherein the tricolor beams emitted from the tricolor light sources are laser linear polarized light beams, the display panel is a liquid crystal display panel, the display panel comprises a via light polarizer on a side adjacent to the two-dimension reflection unit.

13. A backlight module, comprising:
a plurality of tricolor light sources;
a light combining unit configured to combine the tricolor light beams emitted from the plurality of tricolor light sources into a white light beam;
a linear reflection unit comprising a plurality of first micro electro mechanical systems (MEMS) reflectors configured to periodically reflect light beams emitted from the light combining unit; and
a two-dimension reflection unit comprising a plurality of second micro electro mechanical systems reflectors;
wherein each of the second micro electro mechanical systems reflectors comprises a rotatable shaft and a reflection surface, the rotatable shaft is parallel with the emitting direction of the white light beam emitted from the light combining unit.

* * * * *